United States Patent [19]

Kennedy

[11] Patent Number: 5,022,522
[45] Date of Patent: Jun. 11, 1991

[54] BOOK AND SOUND RECORDING HOLDER

[76] Inventor: Kimberly C. Kennedy, 2317 Fair Dr., Knoxville, Tenn. 37918

[21] Appl. No.: 505,507

[22] Filed: Apr. 6, 1990

[51] Int. Cl.⁵ ................. B65D 85/672; B42D 3/00
[52] U.S. Cl. ................. 206/387; 281/31; 206/232
[58] Field of Search .......... 206/472, 473, 474, 475, 206/444, 387, 232; 281/31

[56] References Cited

U.S. PATENT DOCUMENTS

| | | | |
|---|---|---|---|
| 3,708,061 | 1/1973 | Weingarden et al. | 206/472 |
| 3,829,132 | 8/1974 | Willieme | 206/387 X |
| 3,866,751 | 2/1975 | Holert | 206/387 |
| 3,896,929 | 7/1975 | Mills | 206/387 |
| 4,004,689 | 1/1977 | Glasell | 206/387 |
| 4,290,524 | 9/1981 | Azar | 206/387 X |
| 4,558,782 | 12/1985 | Iverson et al. | 206/387 |
| 4,765,462 | 8/1988 | Rose, Jr. | 206/45.24 |
| 4,765,466 | 8/1988 | Ivey | 206/472 X |
| 4,793,477 | 12/1988 | Manning et al. | 206/387 X |
| 4,867,310 | 9/1989 | Cannon et al. | 206/387 |

FOREIGN PATENT DOCUMENTS 077019 4/1983 European Pat. Off. ............ 206/387

*Primary Examiner*—William I. Price
*Attorney, Agent, or Firm*—Pitts and Brittian

[57] ABSTRACT

A book and sound recorder holder (10) for storing a book (12) and a sound recording (14) as a pack. The holder (10) receives and stores a book and a sound recording, such as a cassette, such that the unit can be stored by positioning it on a bookshelf in a library-like manner with the book upright and the binding or spine visible for identifying the book title. In a preferred embodiment the front cover of the book can also be readily viewed from the front of the holder (10). The sound recording (19) is preferably stored proximate the lower portion of the cover at a location which prevents obstructing the view of the front cover of the book bearing the title.

5 Claims, 6 Drawing Sheets

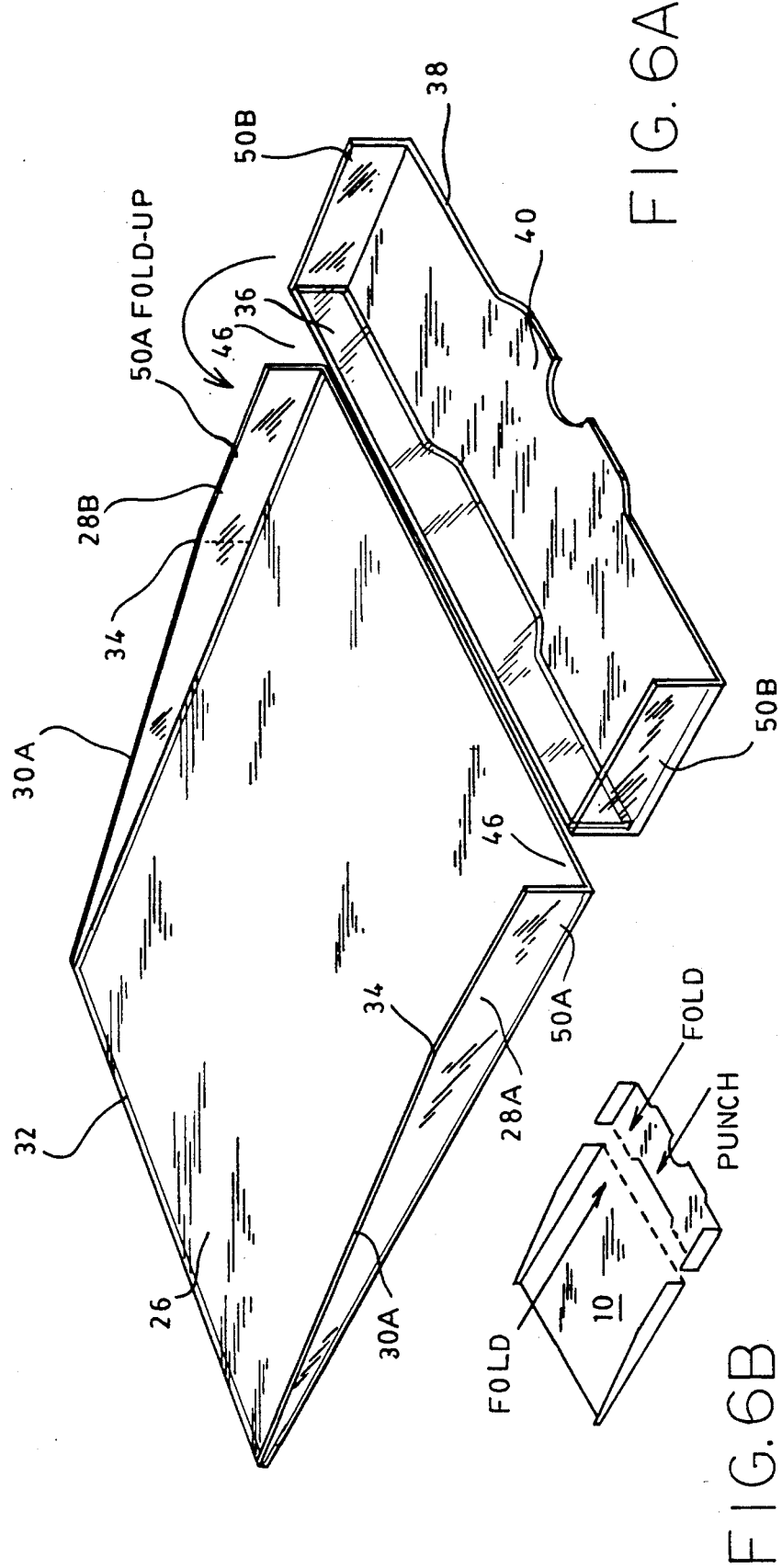

BOOK AND SOUND RECORDING HOLDER

TECHNICAL FIELD

The present invention relates to a book and sound recording holder which can be used to receive and store a book and associated sound recording which may be in the form of a tape cassette, compact disc or the like. More particularly, the holder of the present invention is designed for holding the book and recording together as a pack or unit which allows positioning the holder on a bookshelf in a conventional manner such that the spine of the book, which normally displays the title, can be readily seen for identification.

BACKGROUND ART

Books, particularly for children, are often sold with sound recordings such as tape cassettes. After the book and the sound recordings have been removed from their packages and used, it is common for a child to separate them. This separation reduces the value of the product since the misplacement of the book or the sound recording reduces the likelihood that the two will be used together repeatedly. Adults and parents familiar with the likelihood that the book and sound recording will be separated or misplaced, and with the fact that this separation results in clutter and a reduced useful life, are reluctant to purchase book and sound recording products.

Heretofore, certain devices have been designed which address the problem of keeping cassette tapes bound or stored in association with written materials. Known prior art devices are disclosed in the following U. S. Letters Pat. Nos: 4,793,477; 4,558,782; 4,290,524; 3,896,929; 3,866,751; 3,829,132; and 3,708,061. While certain of the known prior art devices assist in keeping tape cassettes bound together with associated written material during storage, known devices are generally fabricated for adult use and do not display the spine of the book or written material such that it can be stored in a conventional manner on a bookshelf and viewed for identification and selection. Accordingly, it is an object of the present invention to provide a book and sound recording holder which can be readily used by an adult or child. The holder of the present invention serves to receive and store a book and tape cassette, or other sound recording, in a manner such that the unit can be placed on a bookshelf with the book in an upright and conventional position with its spine which normally bears the book title, visible to the reader as his selection is made. Another object of the present invention is to provide a book and sound recording holder which is simple to fabricate and inexpensive to manufacture. Other objects and advantages of the book and sound recording holder of the presen invention will become apparent upon reading the detailed description together with the drawings described as follows.

BRIEF DESCRIPTION OF THE DRAWINGS

FIGS. 6A and 6B illustrate a die and operating schematic.

DISCLOSURE OF THE INVENTION

In accordance with various features of the present invention a book and sound recording holder is provided. The holder is useful in receiving and storing a book and sound recording in a pack form such that the book and sound recording can be held together and readily stored in a conventional manner. The pack can be positioned on a bookshelf in a library-like position with the book upright and the binding or spine visible for identifying the book title. In the preferred embodiment, the front cover of the book can also be readily viewed from the front of the holder. The sound recording, such as a tape cassette, is stored proximate the lower portion of the cover at a location which prevents obstructing the view of the front cover of the book bearing the title.

BEST MODE FOR CARRYING OUT THE INVENTION

Figure 1:
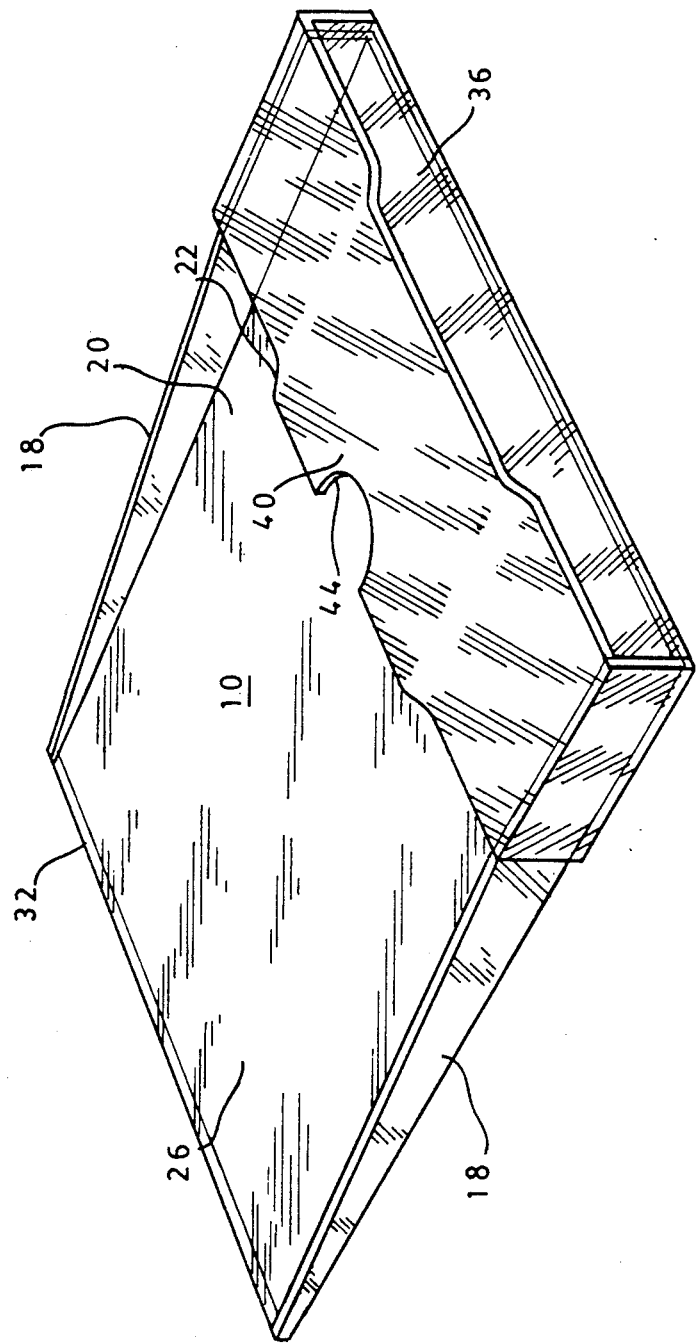
FIG. 1 discloses a perspective view of a book and sound recording holder constructed in accordance with various features of the present invention.
Figure 2:
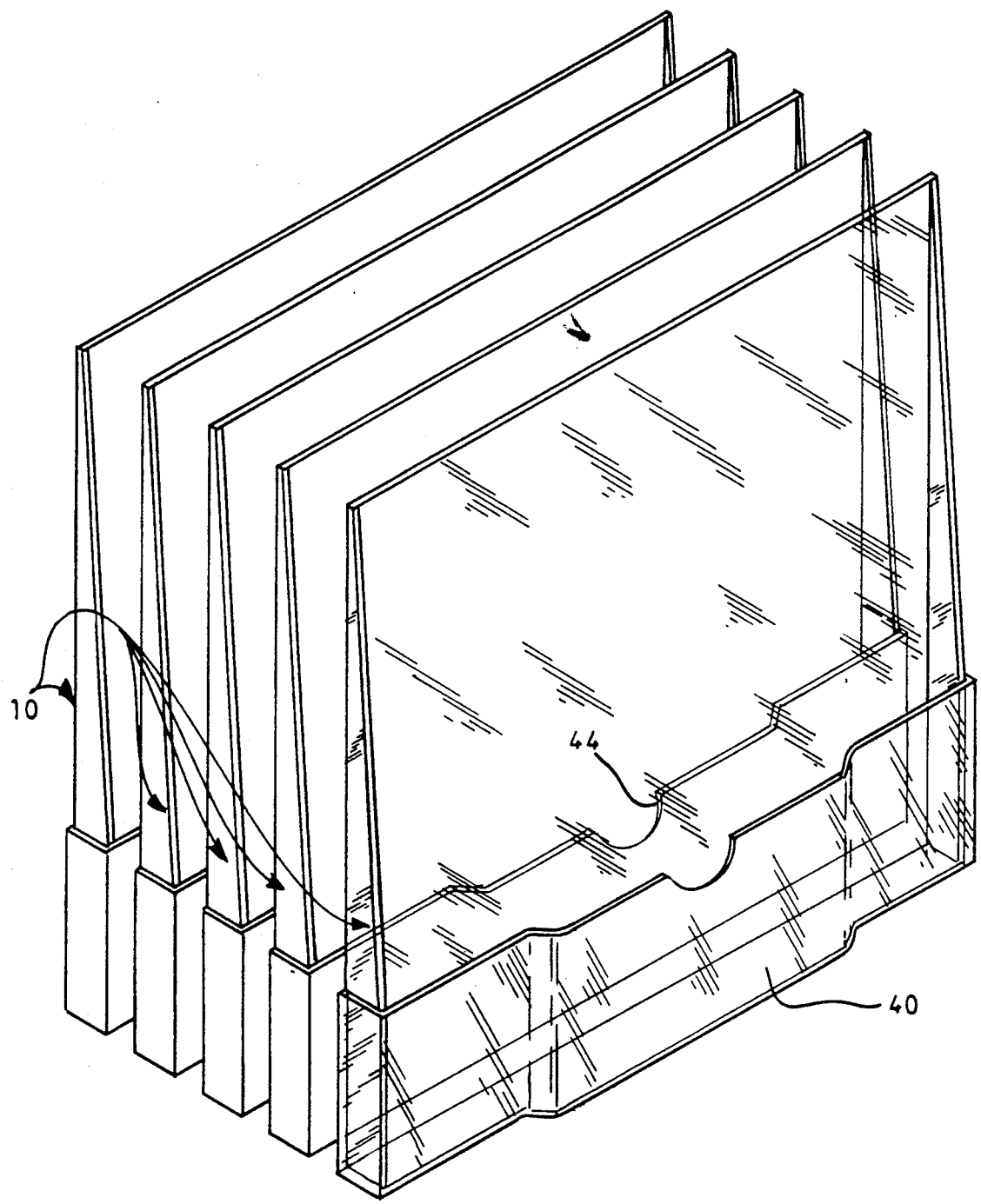
FIG. 2 illustrates a plurality of book and sound recording holders constructed in accordance with the present invention used in a library-like storage in which the book/cassette packs are stored in an upright position such that the book binding can be viewed for identification.

A book and sound recording holder constructed in accordance with various features of the present invention is illustrated generally at 10 in FIG. 1. This holder 10 is designed for receiving and holding a book 12 and a sound recording such as a tape cassette 14, in a manner such that the spine or binding of the book can be readily viewed for identification. Moreover, a pack 16 comprising a book, cassette (or other sound recording) and holder 10 is intended for library-like storage such that the title can be viewed for identification as the pack rests on a bookshelf in an upright position as is shown in FIG. 2.

Figure 3:
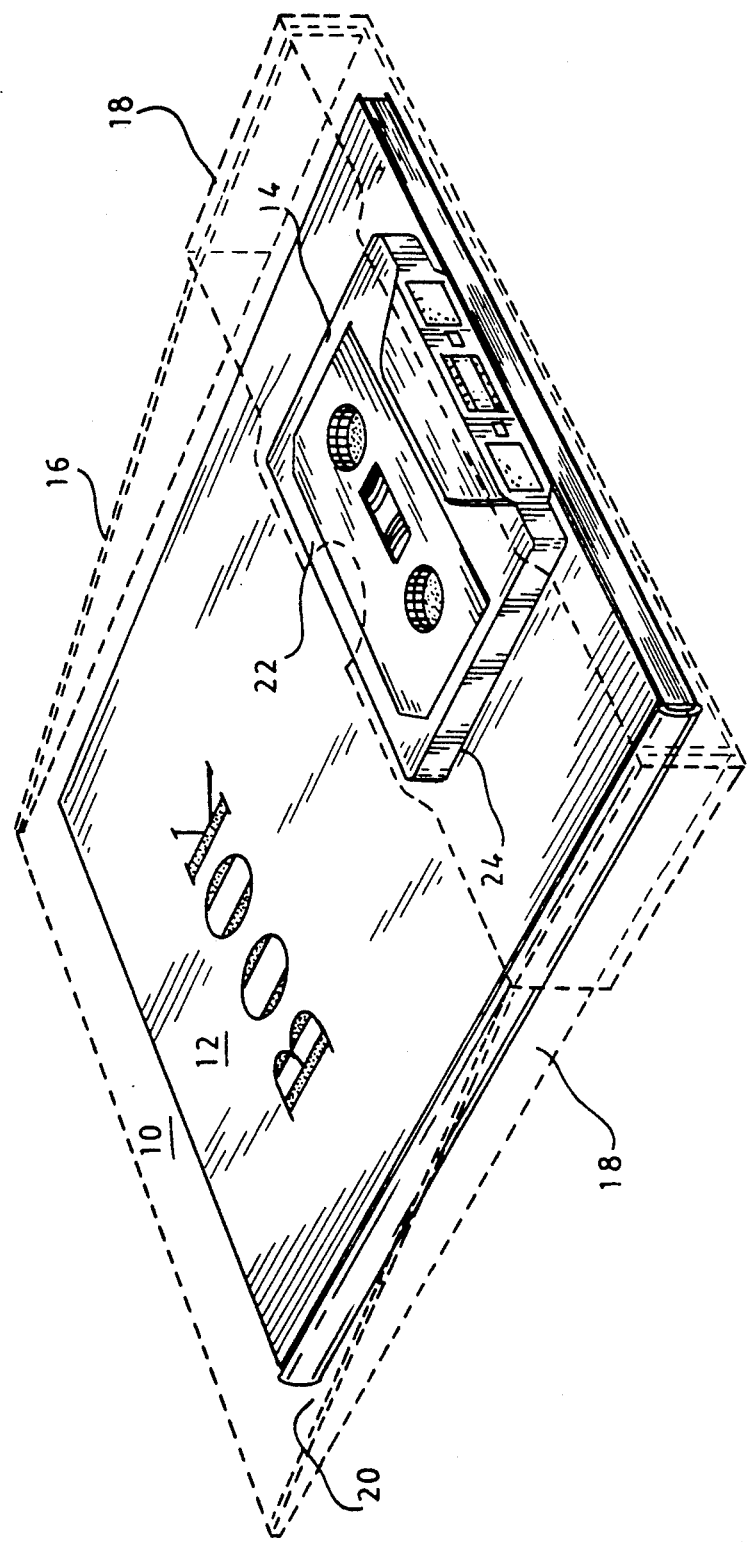
FIG. 3 shows a phantom view of a holder constructed in accordance with the various features of the present invention and depicts the storage position of a tape cassette, which is one form of a sound recording, and book mounted therein.

More specifically, the book and sound recording holder 10 includes wall means generally indicated at 18 which defines a compartment 20 that serves to receive and hold the book 12 for storage. The wall means 18 further defines a compartment 22 which serves to receive a sound recording such as the tape cassette 14. In the illustrated embodiment the book holding compartment 20 and the sound recording holding compartment 22 are integrally formed and positioned relative to each other as is shown in the various figures and particularly FIG. 3. Moreover, in the embodiment depicted the cover of the book when received in the holder 10 is juxtaposed with rear face 24 of the sound recording or cassette tape 14, in this manner the sound recording and the book assist in forming a force fit there between, in the preferred embodiment, to hold the two in a substantially fixed position with respect to each other and within the holder 10.

Referring with more specificity to the wall means 18, it will be noted that this wall means includes a back wall 26 which is substantially rectangular in configuration and which receives the back cover of the book. The sides 28A and 28B of the holder are substantially identical in configuration and in the illustrated embodiment each side includes a tapered portion 30A extending from the top 32 of the holder 10 to the location indicated at 34. At this location, it is noted that the sides are substantially rectangular from location 34 to the base 36 of the holder. The tapered portions 30A facilitate viewing the title of the book on spine if the holder is fabricated from a material which cannot be seen through. A front wall 38 serves to enclose the lower portion of the holder 10 such that when combined with the other wall means, the holder 10 defines a compartment as illustrated which holds the book and the sound recording. To this end, the front wall includes an enlarged section 40 which is displaced from the back wall 26 by an amount sufficient to define the compartment 22 for receiving the sound recording such as the tape cassette 14. Section 40 of front wall defines a compartment which approximates the configuration of a sound recording which is to be stored therein.

Figure 4:
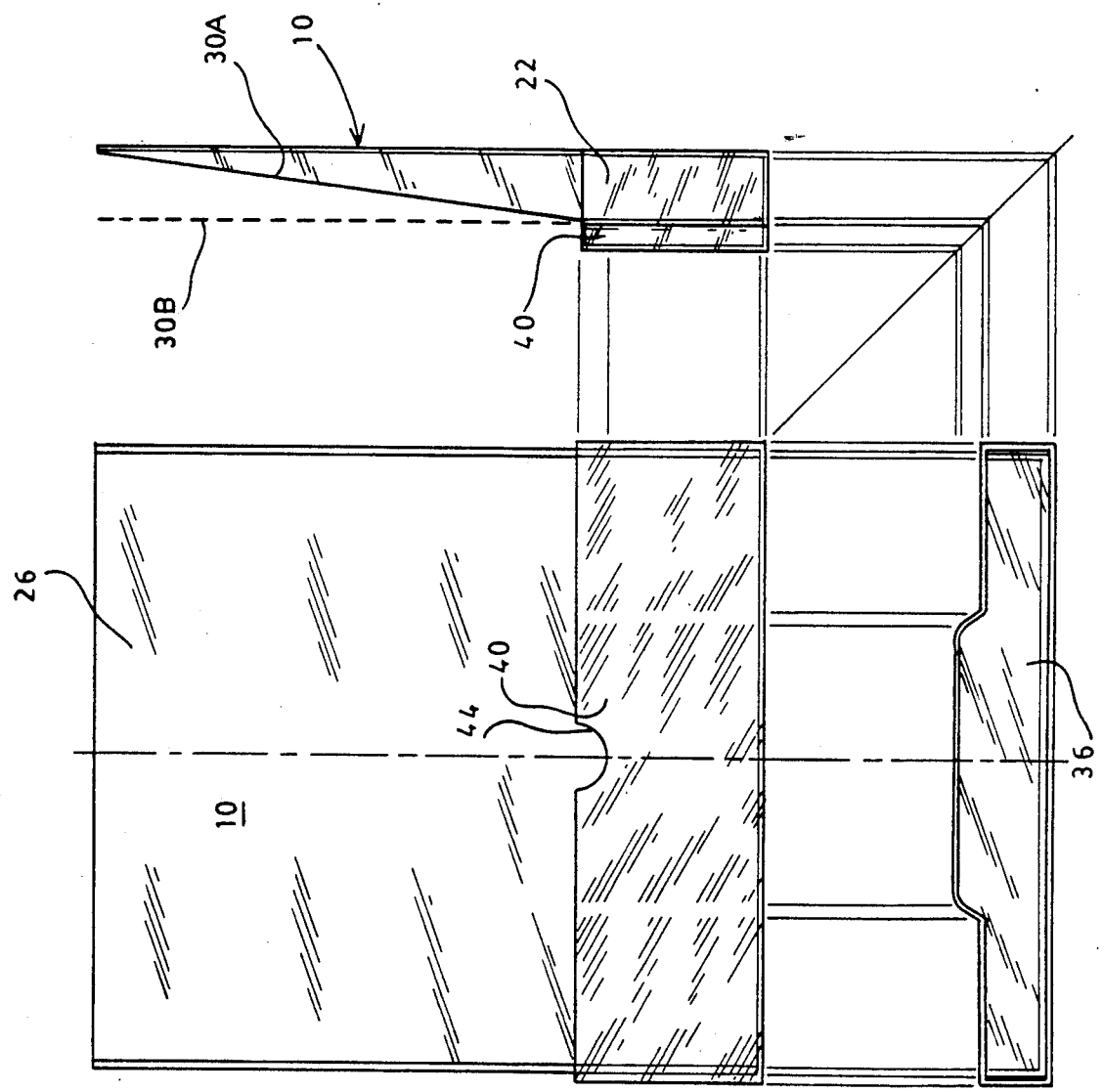
FIG. 4 illustrates an orthographic projection of the holder shown in FIG. 1.

While the side walls 28A and 28B include the tapered sections 30A as shown in the figures, an alternate embodiment could include substantially rectangular sides 28A as shown in FIG. 4 by the phantom line 30B. The tapered side walls however may be desirable to more clearly display the title of the book when the holder, book and sound recording pack are used for library-like storage. This type of storage is illustrated in FIG. 2 with the book and sound recording removed for purposes of illustration.

FIG. 4 illustrates an orthographic projection of the front, bottom and side view of the book and sound recording holder constructed in accordance with various features of the present invention. This figure depicts preferred configurations and shows the base 36 of the holder together with the outline of the base portion of the sound recording compartment 22. It will also be noted that in the preferred embodiment used for storing a tape cassette type sound recording, a cut-away opening 44 is provided in section 40 of front wall 38 to facilitate gripping and removing the cassette.

Figure 5:
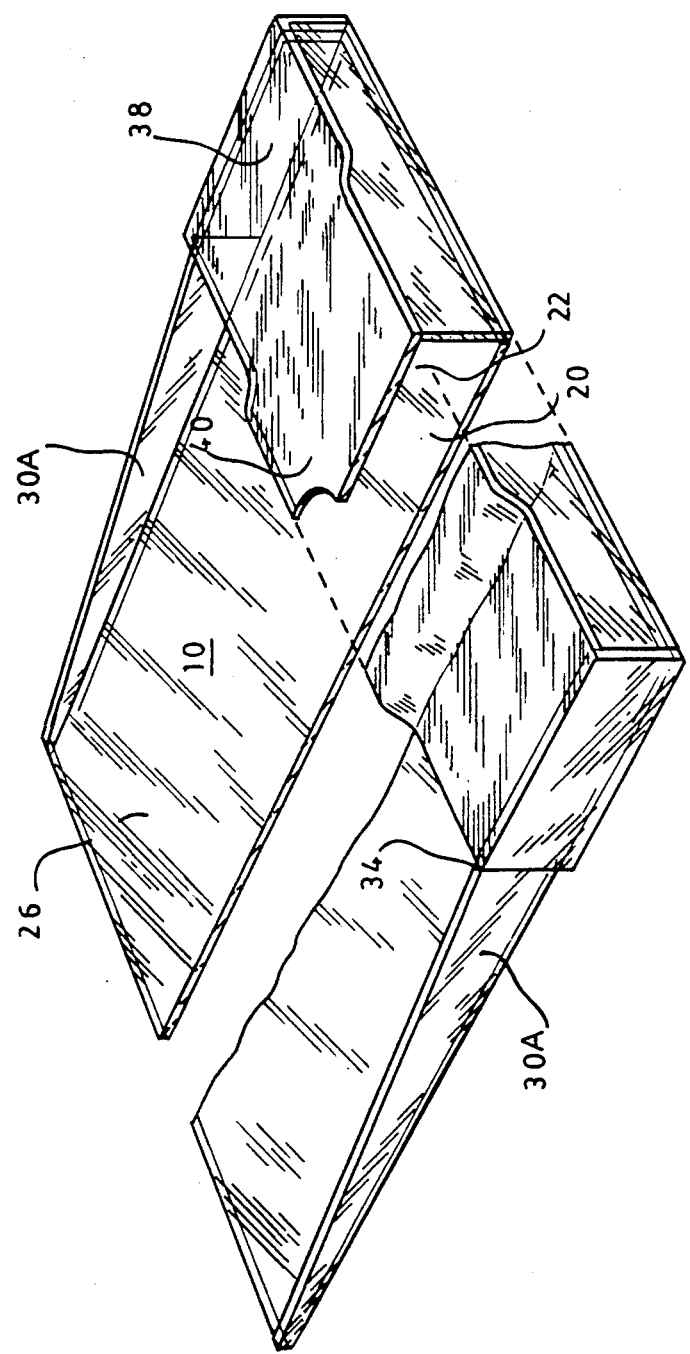
FIG. 5 illustrates a cross-sectional view of the holder show in FIG. 1.

FIG. 5 illustrates a cross-sectional view of the holder 10 with a portion of the holder being broken away for purposes of illustration. It can be seen in this view that the compartment 20 for holding the book is integrally formed with the compartment 22 which serves to hold the sound recording. Of course, the compartment 22 can assume various geometries depending on the particular type of sound recording used. For example, if a compact disc is used this compartment would assume a geometry approximating that of the compact disc.

FIGS. 6A and 6B illustrate a desired die and operating schematic. These figures, comprising FIGS. 6A and 6B, readily depict how the device could be fabricated from a flat sheet like material and folded to form the holder. For example, when the device is fabricated from a suitable plastic sheet material the material is cut such that the tapered side walls 30A slope outwardly from the top 32 to the locations 34 which form the lower portions of the sides 28A and 28B. Sections generally indicated at 46 are cut from the sheet material such that the forward wall 38 can fold such that the sides 50A and 50B can be sealed together. It will be noted in FIG. 6B that the sound recording compartment is fabricated by punching or otherwise forming the forward wall 38 to form the enlarged or punched section 40 that serves to receive the sound recording. The type of forming may vary with the type of sheet material used.

From the foregoing detailed description, it will be recognized by those skilled in the art that a holder for a book and sound recording capable of being fabricated from a sheet like material has been described and illustrated. The holder is designed to receive a book and sound recording, such as a tape cassette, therein to form a pack that can be stored in a library-like manner on a bookshelf. In this connection the spine of the book bearing the title can be readily seen for identification. Preferably the holder is fabricated from a translucent or transparent material to facilitate viewing the book spine for title identification when the pack is stored. The holder defines a book receiving compartment and a sound recording receiving compartment. In a preferred embodiment the holder includes a cut away front wall which is designed such that the cover of the book can be readily viewed from the front of the holder.

It is, of course, understood that although preferred embodiments of the present invention have been illustrated and described, various modifications thereof will become apparent to those skilled in the art and, accordingly, the scope of the present invention should be defined only by the appended claims and equivalents thereof.

I claim:

1. A holder for a book and sound recording such as a tape cassette, comprising:
    wall means defining a first compartment for receving and holding said book for storage and a further compartment for holding said sound recording proximate the lower portion of said book held in said first compartment, wherein said sound recording is held by said further compartment juxtaposed against said book so that both said book and said recording media are mutually prevented by friction therebetween from easily falling out of said first and further compartments.

2. A holder for a book and sound recording such as a tape cassette, comprising:
    wall means defining a first compartment for receiving and holding a book for storage and a further compartment for holding said sound recording proximate the lower portion of said book held in said first compartment, wherein said wall means includes a back wall, opposed side walls, a base wall, and a front wall which are joined to define a book-holding compartment and a compartment for holding a sound recording, said front wall extending from said base wall upwardly and overlaying only a part of the front cover of said book to facilitate identification of said book.

3. A holder for a book and sound recording such as a tape cassette, comprising:
    wall means defining a first compartment for receiving and holding a book for storage and a further compartment for holding said sound recording proximate the lower portion of said book held in said first compartment, wherein said wall means includes a back wall, opposed side walls, a base wall, and a front wall which are joined to define a book-holding compartment and a compartment for holding a sound recording media, said front wall extending from said bas wall upwardly and overlaying only a part of the front cover of said book to facilitate identification of said book, sand wherein at least one side wall of said holder is tapered to facilitate viewing at least a portion of the spine of said book for title identification purposes.

4. A holder for a book and sound recording such as a tape cassette, comprising:

wall means defining a first compartment for receiving and holding a book for storage and a further compartment for holding said sound recording proximate the lower portion of said book held in said first compartment, wherein said wall means includes a back wall, opposed side walls, a base wall, and a front wall which are joined to define a book-holding compartment and a compartment for holding a sound recording, said front wall extending from said base wall upwardly and overlaying only a part of the front cover of said book to facilitate identification of said book, wherein said bookholder front wall further defines an enlarged section which receives a sound recording proximate a lower portion of said book such that said sound recording does not block the title of said book stored therein.

5. The holder of claim 1 wherein at least a portion of said wall means is fabricated from a transparent material to facilitate viewing at least a portion of a book stored therein for purposes of identification.

* * * * *